United States Patent
Ouyang

(10) Patent No.: US 9,716,432 B2
(45) Date of Patent: Jul. 25, 2017

(54) SWITCHING CONVERTER WITH CONSTANT ON-TIME CONTROLLER THEREOF

(71) Applicant: Chengdu Monolithic Power Systems Co., Ltd., Chengdu (CN)

(72) Inventor: Qian Ouyang, Hangzhou (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 0 days.

(21) Appl. No.: 14/631,547

(22) Filed: Feb. 25, 2015

(65) Prior Publication Data
US 2015/0244262 A1    Aug. 27, 2015

(30) Foreign Application Priority Data

Feb. 27, 2014    (CN) .......................... 2014 1 0068746

(51) Int. Cl.
*H02M 3/158* (2006.01)
*H02M 1/08* (2006.01)
*H02M 1/00* (2006.01)

(52) U.S. Cl.
CPC ............. *H02M 3/158* (2013.01); *H02M 1/08* (2013.01); *H02M 2001/0025* (2013.01)

(58) Field of Classification Search
CPC ....... H02M 1/08; H02M 3/157; H02M 3/1588
USPC ................... 323/222, 271, 282–285
See application file for complete search history.

(56) References Cited

U.S. PATENT DOCUMENTS

| | | | |
|---|---|---|---|
| 8,198,880 B2 | 6/2012 | Ouyang | |
| 8,400,129 B2 | 3/2013 | Ouyang | |
| 8,686,703 B2 | 4/2014 | Xi | |
| 8,717,002 B2 | 5/2014 | Xi | |
| 8,749,216 B2 | 6/2014 | Li et al. | |
| 8,836,304 B2 | 9/2014 | Sheng et al. | |
| 8,872,501 B2 | 10/2014 | Dong et al. | |
| 8,912,776 B2 | 12/2014 | Qian et al. | |
| 8,922,177 B2 | 12/2014 | Ren et al. | |
| 8,941,367 B2 | 1/2015 | Li et al. | |
| 8,963,523 B2 | 2/2015 | Wang | |
| 2005/0007087 A1* | 1/2005 | Pullen | H02M 3/156 323/283 |
| 2010/0134080 A1* | 6/2010 | Ouyang | H02M 3/158 323/282 |
| 2011/0260703 A1* | 10/2011 | Laur | H02M 3/1563 323/271 |
| 2013/0002221 A1 | 1/2013 | Wang et al. | |
| 2013/0038301 A1 | 2/2013 | Ouyang et al. | |
| 2013/0141069 A1 | 6/2013 | Li | |

(Continued)

*Primary Examiner* — Gary L Laxton
*Assistant Examiner* — Kyle J Moody

(57) ABSTRACT

A control circuit for controlling a switching circuit has a ramp compensation circuit, a DC calibration circuit, a comparison circuit and a logic circuit. The ramp compensation circuit generates a ramp compensation signal. The DC calibration circuit generates a DC calibration signal by sampling and holding the ramp compensation signal. The comparison circuit generates a comparison signal according to the ramp compensation signal, a feedback signal representative of an output voltage of the switching converter, a reference signal and the DC calibration signal. The logic circuit generates a control signal to control the switching circuit according to an on-time signal and the comparison signal.

19 Claims, 3 Drawing Sheets

(56) References Cited

U.S. PATENT DOCUMENTS

| | | | |
|---|---|---|---|
| 2013/0257399 A1* | 10/2013 | Jiang | G05F 1/10 323/271 |
| 2014/0022684 A1 | 1/2014 | Jiang et al. | |
| 2014/0035654 A1 | 2/2014 | Jiang et al. | |
| 2015/0069982 A1* | 3/2015 | Ouyang | H02M 3/156 323/234 |
| 2016/0036326 A1* | 2/2016 | Sreenivas | H02M 3/158 323/271 |

* cited by examiner

SWITCHING CONVERTER WITH CONSTANT ON-TIME CONTROLLER THEREOF

CROSS-REFERENCE TO RELATED APPLICATION(S)

This application claims the benefit of CN application 201410068746.6, filed on Feb. 27, 2014, and incorporated herein by reference.

TECHNICAL FIELD

The present invention relates to electrical circuits, more particularly but not exclusively to switching converters with Constant-On-Time control and controllers thereof.

BACKGROUND

Constant-On-Time control is widely used in power supplies due to its outstanding performance of load transient response, simple circuit configuration and smooth transition between operation modes, etc.

A switching converter with Constant-On-Time control comprises an output capacitor which may be equivalent to a resistor and an ideal capacitor coupled serially together. When the resistance of the equivalent resistor is small, the switching converter may oscillate easily, and a ramp compensation signal is consequently required to stabilize the switching converter.

A prior art method employs a saw-tooth signal as the ramp compensation signal. The saw-tooth signal is in-phase with a current flowing through an output inductor of the switching converter and has a fixed magnitude which is larger than the capacitor voltage ripple of the ideal capacitor. As a result, the switching converter is stable in steady state. However, when a load of the switching converter steps up, the capacitor voltage ripple increases rapidly and the saw-tooth signal with the fixed magnitude thus fails to override the capacitor voltage ripple. The oscillation event may still occur in the switching converter.

Another prior art method uses a low-side current detection circuit to detect a current flowing through a low-side switch of the switching converter and thereby generates the ramp compensation signal. The magnitude of the ramp compensation signal varies along with the inductor current automatically when the load steps up. Thus, this method is capable of overriding the capacitor voltage ripple to make the switching converter stable. However, a high-speed current detection amplifier is usually required to realize real-time inductor current detection, which in turn complicates the circuit configuration.

In addition, the prior-art compensation circuit brings in a direct current offset in an output signal of the switching converter. Accordingly, a DC calibration circuit implemented by an error amplifier is required to cancel the DC offset. Due to the slow response of the error amplifier, it may take a long time for the output signal to get back to a preset value during load transients. Thus, the transient response of the switching converter is poor.

SUMMARY

Embodiments of the present invention are directed to a control circuit for controlling a switching circuit, wherein the switching circuit comprises a switch, and the switching circuit is configured to convert an input voltage into an output voltage, the control circuit comprises an on-time generating circuit configured to generate an on-time signal; a ramp compensation circuit configured to generate a ramp compensation signal; a DC calibration circuit configured to generate a DC calibration signal by sampling the ramp compensation signal during a transition period when the switch transits from a first state into a second state and holding the sampled ramp compensation signal until the next transition period; a comparison circuit electrically coupled to the ramp compensation circuit and the DC calibration circuit, wherein the comparison circuit is configured to generate a comparison signal based on a feedback signal representative of the output voltage, a reference signal, the ramp compensation signal and the DC calibration signal; and a logic circuit electrically coupled to the on-time generating circuit and the comparison circuit, wherein the logic circuit is configured to generate a control signal to control the switching circuit based on the on-time signal and the comparison signal.

Embodiments of the present invention are also directed to a switching converter comprising a switching circuit configured to convert an input voltage into an output voltage, wherein the switching circuit comprises a switch; and a control circuit comprising an on-time generating circuit configured to generate an on-time signal; a ramp compensation circuit configured to generate a ramp compensation signal; a DC calibration circuit configured to generate a DC calibration signal by sampling the ramp compensation signal during a transition period when the switch transits from a first state into a second state and holding the sampled ramp compensation signal until the next transition period; a comparison circuit electrically coupled to the ramp compensation circuit and the DC calibration circuit, wherein the comparison circuit is configured to generate a comparison signal based on a feedback signal representative of the output voltage, a reference signal, the ramp compensation signal and the DC calibration signal; and a logic circuit electrically coupled to the on-time generating circuit and the comparison circuit, wherein the logic circuit is configured to generate a control signal to control the switching circuit based on the on-time signal and the comparison signal.

Embodiments of the present invention are further directed to a control circuit for controlling a switching circuit, wherein the switching circuit comprises a high-side switch, a low-side switch and an inductor and the switching circuit is configured to convert an input voltage into an output voltage, the control circuit comprises an on-time generating circuit configured to generate an on-time signal; a ramp compensation circuit configured to generate a ramp compensation signal by charging a compensation capacitor with a current proportional to the difference between the input voltage and the output voltage and discharging the compensation capacitor with a current proportional to the output voltage, and by further sampling an inductor current flowing through the inductor so that the ramp compensation signal represents the inductor current for each switching cycle; a DC calibration circuit configured to generate a DC calibration signal; a comparison circuit electrically coupled to the switching circuit, the ramp compensation circuit and the DC calibration circuit, wherein the comparison circuit is configured to generate a comparison signal based on a feedback signal representative of the output voltage, a reference signal, the ramp compensation signal and the DC calibration signal; and a logic circuit electrically coupled to the on-time generating circuit and the comparison circuit, wherein the logic circuit is configured to generate a control signal to control the switching circuit based on the on-time signal and the comparison signal.

BRIEF DESCRIPTION OF THE DRAWINGS

The present invention can be further understood with reference to the following detailed description and the appended drawings, wherein like elements are provided with like reference numerals.

DETAILED DESCRIPTION

Figure 1:
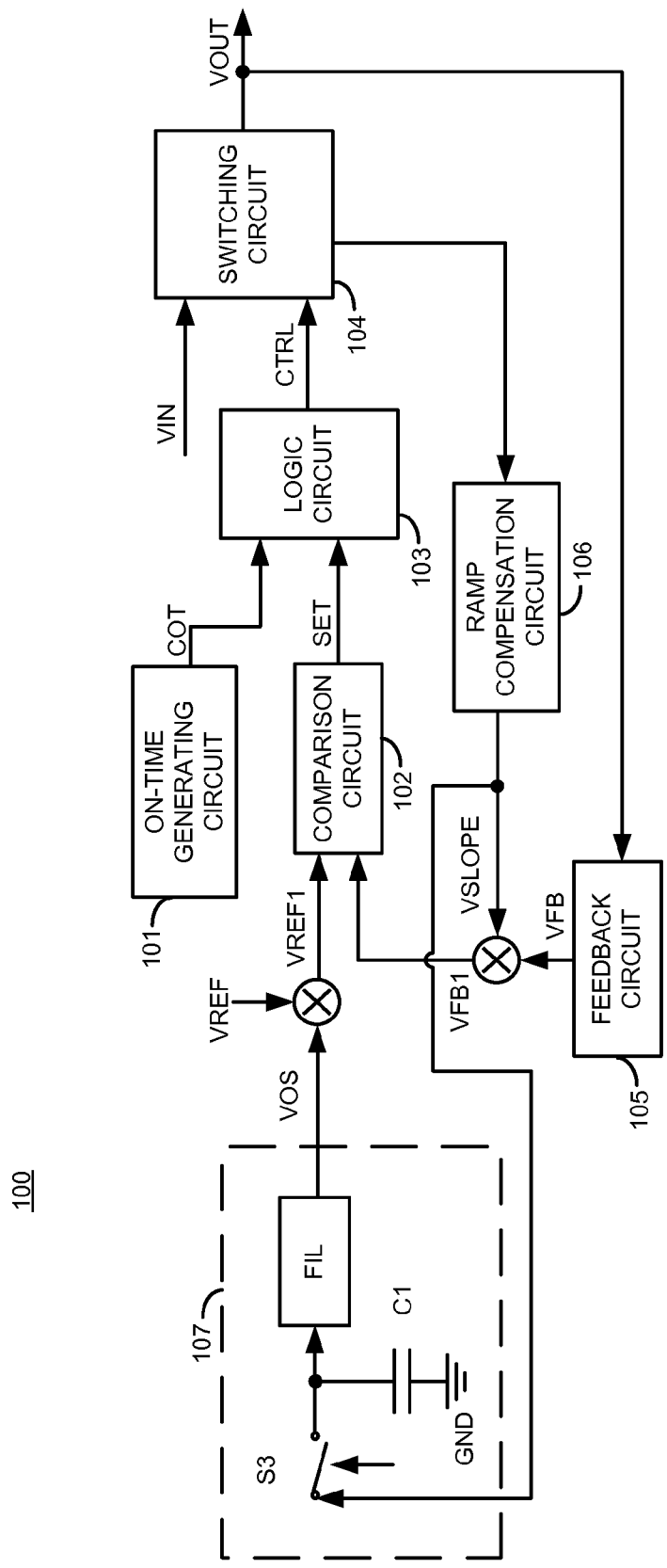
FIG. 1 illustrates a switching converter 100 with Constant-On-Time control in accordance with an embodiment of the present invention.

The present invention is now described. While it is disclosed in its preferred form, the specific embodiments of the invention as disclosed herein and illustrated in the drawings are not to be considered in a limiting sense. Rather, these embodiments are provided so that this invention will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

Throughout the specification, the meaning of "a," "an," and "the" may also include plural references.

FIG. 1 illustrates a switching converter 100 with Constant-On-Time control in accordance with an embodiment of the present invention. As shown in FIG. 1, the switching converter 100 comprises a control circuit, a switching circuit 104 and a feedback circuit 105. The switching circuit 104 comprises a high-side switch, a low-side switch and an output inductor. The switching circuit 104 is configured to convert an input voltage VIN into an output voltage VOUT. In one embodiment, the switching circuit 104 may be implemented by any suitable DC/DC or AC/DC converting topologies, such as a boost converting circuit, a buck converting circuit, etc. In another embodiment, the high-side switch or the low-side switch of the switching circuit 104 may be implemented by any controllable switching semiconductor devices, such as MOSFET, IGBT or the like. The feedback circuit 105 is electrically coupled to the switching circuit 104 and is configured to generate a feedback signal VFB representative of the output voltage VOUT. Persons of ordinary skill in the art will recognize that the feedback circuit 105 may be omitted from the switching converter 100 in some embodiments, and the output voltage VOUT may be used instead of the feedback signal VFB.

The control circuit comprises an on-time generating circuit 101, a comparison circuit 102, a logic circuit 103, a ramp compensation circuit 106 and a DC calibration circuit 107. The ramp compensation circuit 106 is electrically coupled to the switching circuit 104 to detect a low-side current flowing through the low-side switch and the ramp compensation circuit 106 is configured to generate a ramp compensation signal VSLOPE emulating an inductor current flowing through the output inductor based on the low-side current. In one embodiment, the ramp compensation circuit 106 may detect a high-side current flowing through the high-side switch and generates the ramp compensation signal VSLOPE based on the high-side current. In another embodiment, the low-side current detection may be implemented by serially coupling a resistor in the circuit loop consisting of the low-side switch and the output inductor and further detecting the voltage drop across the resistor. In further another embodiment, the low-side current detection may be implemented by detecting the voltage drop across the low-side switch when it is turned on. The sum of the ramp compensation signal VSLOPE and the feedback signal VFB is configured to generate a compensated feedback signal VFB1.

The DC calibration circuit 107 is electrically coupled to the ramp compensation circuit 106 to receive the ramp compensation signal VSLOPE and is configured to generate a DC calibration signal VOS based on the ramp compensation signal VSLOPE. The sum of the DC calibration signal VOS and a reference signal VREF is configured to generate a calibrated reference signal VREF1.

The DC calibration circuit 107 comprises a switch S3, a calibration capacitor C1 and a filtering circuit FIL. The switch S3 has a first terminal, a second terminal and a control terminal, wherein the first terminal is electrically coupled to the ramp compensation circuit 106 to receive the ramp compensation signal VSLOPE. The calibration capacitor C1 is electrically coupled between the second terminal of the switch S3 and a reference ground GND. The filtering circuit FIL has an input terminal and an output terminal, wherein the input terminal is electrically coupled the second terminal of the switch S3, and the output terminal is configured as an output terminal of the DC calibration circuit 107. In one embodiment, the filtering circuit FIL may be implemented by a low-pass filter, e.g., an active or passive low-pass filtering circuit, a first-order or multiple order low-pass filtering circuit. During the transition period when the high-side switch transits from an off state into an on state and the low-side switch is transits from an on state into an off state, the switch S3 of the DC calibration circuit 107 is turned on, and the ramp compensation signal VSLOPE is sampled by the calibration capacitor C1. The sampled ramp compensation signal is further held on the calibration capacitor C1 until the next transition period. Through the filtering circuit FIL, the sampled ramp compensation signal held on the calibration capacitor C1 is filtered and the DC calibration signal VOS is accordingly generated. The sum of the DC calibration signal VOS and the reference signal VREF is configured to generate the calibrated reference signal VREF1. The DC calibration circuit 107 of the present invention eliminates the DC offset by sampling and holding the ramp compensation signal instead of by using a conventional low-speed amplifier, the transient response performance of the switching converter is thus improved.

The comparison circuit 102 has a first input terminal, a second input terminal and an output terminal, wherein the first input terminal is configured to receive the calibrated reference signal VREF1, the second input terminal is configured to receive the compensated feedback signal VFB1. The comparison circuit 102 compares the compensated feedback signal VFB1 with the calibrated reference signal VREF1 and generates a comparison signal SET at the output terminal. The on-time generating circuit 101 is configured to generate an on-time signal COT to control the time when the high-side switch of the switching circuit 104 is in an on state through the logic circuit 103. The logic circuit 103 has a first input terminal, a second input terminal and an output terminal, wherein the first input terminal is electrically coupled to the on-time generating circuit 101 to receive the on-time signal COT, the second input terminal is electrically coupled to the output terminal of the comparison circuit 102 to receive the comparison signal SET. The logic circuit 103 is configured to generate a control signal CTRL based on the on-time signal COT and the comparison signal SET to control the switching actions of the high-side switch and the low-side switch of the switching circuit 104.

Figure 2:
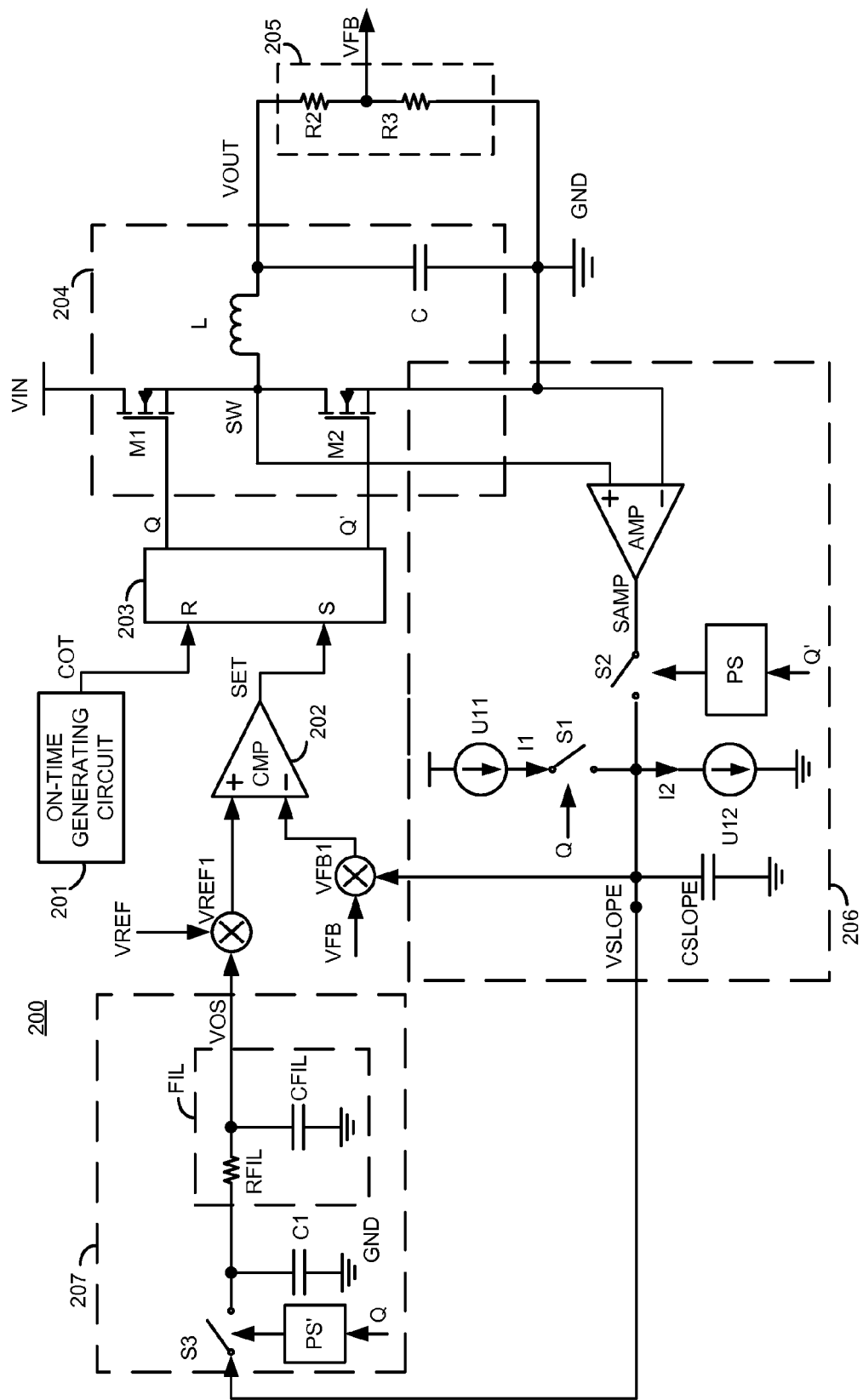
FIG. 2 illustrates a Constant-On-Time switching converter 200 in accordance with an embodiment of the present invention.

FIG. 2 illustrates a Constant-On-Time switching converter 200 in accordance with an embodiment of the present invention. As shown in FIG. 2, the switching converter 200 comprises a control circuit, a switching circuit 204 and a feedback circuit 205. The switching circuit 204 is implemented by a synchronous buck converter in the illustrated embodiment and comprises a high-side switch M1, a low-side switch M2, an output inductor L and an output capacitor C. The high-side switch M1 has a first terminal, a second terminal and a control terminal, wherein the first terminal is configured to receive an input voltage VIN. The low-side switch M2 has a first terminal, a second terminal and a control terminal, wherein the first terminal is electrically coupled to the second terminal of the high-side switch M1 to form a switching node SW together, the second terminal is electrically coupled to a reference ground GND. The output inductor L has a first terminal and a second terminal, wherein the first terminal is electrically coupled to the switching node SW. The output capacitor C is electrically coupled between the second terminal of the output inductor L and the reference ground GND. The common node of the output capacitor C and the output inductor L is configured as an output terminal of the switching circuit 204 to provide an output voltage VOUT. The switching circuit 204 is configured to converter the input voltage VIN into the output voltage VOUT by turning on and off the high-side switch M1 and the low-side switch M2 alternatively. The feedback circuit 205 is electrically coupled to the output terminal of the switching circuit 204 and is configured to generate a feedback signal VFB representative of an output signal of the switching circuit 204. In the embodiment illustrated in FIG. 2, the feedback circuit 205 comprises a voltage divider consisting of a resistor R1 and a resistor R2. The resistor R1 has a first terminal and a second terminal, wherein the first terminal is electrically coupled to the output terminal of the switching circuit 204. The resistor R2 has a first terminal and a second terminal, wherein the first terminal is electrically coupled to the second terminal of the resistor R1, and the second terminal is connected to the reference ground GND.

The control circuit comprises an on-time generating circuit 201, a comparison circuit 202, a logic circuit 203, a ramp compensation circuit 206 and a DC calibration circuit 207. The ramp compensation circuit 206 is electrically coupled to the low-side switch M2 to receive a low-side current flowing through the low-side switch M2 and is configured to generate a ramp compensation signal VSLOPE emulating an inductor current flowing through the output inductor L based on the low-side current. In detail, the ramp compensation circuit 206 comprises an amplifier AMP, a switch S1, a switch S2, a current source U11, a current sink U12, a compensation capacitor CSLOPE and a pulse generating circuit PS. The amplifier AMP2 has a non-inverting input terminal, an inverting input terminal and an output terminal, wherein the non-inverting input terminal is electrically coupled to the switching node SW, the inverting input terminal is electrically coupled to the reference ground GND. When the low-side switch M2 is turned on, the amplifier AMP detects the low-side current flowing through the low-side switch M2 and provides an amplifying signal SAMP at the output terminal. In another embodiment, for the detection of the low-side current flowing through the low-side switch M2, a resistor may be electrically coupled between the second terminal of the low-side switch M2 and the reference ground GND, and the non-inverting input terminal and the inverting input terminal of the amplifier AMP are respectively coupled to the two terminals of the resistor. The pulse generating circuit PS is electrically coupled to the logic circuit 203 to receive a control signal Q' and is configured to generate a pulse signal based on the control signal Q'. The switch S2 has a first terminal, a second terminal and a control terminal, wherein the first terminal is electrically coupled to the output terminal of the amplifier AMP, and the control terminal is electrically coupled to the pulse generating circuit PS to receive the pulse signal. The current source U11 has an input terminal and an output terminal, wherein the input terminal is configured to receive a supply voltage, and the output terminal is configured to provide a first current I1 which is proportional to the input voltage VIN. The switch S1 has a first terminal, a second terminal and a control terminal, wherein the first terminal is electrically coupled to the output terminal of the current source U11, the second terminal is electrically coupled to the second terminal of the switch S2, and the control terminal is electrically coupled to the logic circuit 203 to receive a control signal Q. The current sink U12 has in input terminal and an output terminal, wherein the input terminal is electrically coupled to the second terminal of the switch S1 and is configured to provide a second current I2 which is proportional to the output voltage VOUT, and the output terminal is electrically coupled to the reference ground GND. The compensation capacitor CSLOPE has a first terminal and a second terminal, wherein the first terminal is electrically coupled to the second terminal of the switch S1, and the second terminal is electrically coupled to the reference ground GND. The first terminal of the compensation capacitor CSLOPE is configured as the output terminal of the ramp compensation circuit 206 to provide the ramp compensation signal VSLOPE. The sum of the ramp compensation signal VSLOPE and the feedback signal VFB is configured to generate a compensated feedback signal VFB1.

In another embodiment, the ramp compensation circuit 206 may further comprise another switch having a first terminal, a second terminal and a control terminal. The first terminal is electrically coupled to the output terminal of the current source U12, the second terminal is electrically coupled to the reference ground GND, and the control terminal is electrically coupled to the pulse generating circuit PS to receive an inverting signal of the pulse signal. In this way, when the switch S2 is in an on state, the switch is turned off so that the ramp compensation circuit 206 is able to sample the amplifying signal SAMP. And when the switch S2 is in an off state, the switch is turned on so as to discharge the compensation capacitor CSLOPE when the low-side switch M2 is in an on state. However, persons of ordinary skill in the art will recognize that, as the second current I2 is very low, the charging voltage of the compensation capacitor CSLOPE barely varies and the ramp compensation circuit operates normally when the switch S2 is on even if the switch is omitted from the ramp compensation circuit 206.

The DC calibration circuit 207 comprises a switch S3, a pulse generating circuit PS', a calibration capacitor C1 and a filtering circuit FIL. The switch S3 has a first terminal, a second terminal and a control terminal, wherein the first terminal is electrically coupled to the output terminal of the ramp compensation circuit 206 to receive the ramp compensation signal VSLOPE. The pulse generating circuit PS' is configured to receive the control signal Q and to provide a pulse signal to the control terminal of the switch S3 based on the control signal Q. The calibration capacitor C1 is electrically coupled between the second terminal of the switch S3 and the reference ground GND. The filtering circuit FIL comprises a filtering resistor RFIL and a filtering capacitor CFIL. The filtering resistor RFIL has a first terminal and a second terminal, wherein the first terminal is electrically coupled to the second terminal of the switch S3. The filtering capacitor CFIL has a first terminal and a second terminal, wherein the first terminal is electrically coupled to the second terminal of the filtering resistor RFIL and is configured as an output terminal of the DC calibration circuit 207 to provide a DC calibration signal VOS, and the second terminal is electrically coupled to the reference ground GND. The sum of the DC calibration signal VOS and the reference signal VREF is configured to generate a calibrated reference signal VREF1.

The comparison circuit 202 employs a comparator CMP having a non-inverting input terminal, an inverting input terminal and an output terminal. The non-inverting input terminal is configured to receive the calibrated reference signal VREF1, the inverting input terminal is configured to receive the compensated feedback signal VFB1. The comparator 202 compares the compensated feedback signal VFB1 with the calibrated reference signal VREF1 and generates a comparison signal SET at the output terminal. The on-time generating circuit 201 is configured to generate an on-time signal COT to control the time when the high-side switch M1 of the switching circuit 204 is in the on state. The logic circuit 203 comprises a flip-flop having a set terminal S, a reset terminal R, wherein the set terminal S is electrically coupled to the output terminal of the comparison circuit 202 to receive the comparison signal SET, and the reset terminal R is electrically coupled to the on-time generating circuit 201 to receive the on-time signal COT. The flip-flop is configured to respectively provide the control signal Q and Q' to the control terminals of the high-side switch M1 and the low-side switch M2 based on the on-time signal COT and the comparison signal SET, so as to control the switching actions of the high-side switch M1 and the low-side switch M2.

When then high-side switch M1 is in the off state and the low-side switch M2 is in the on state, i.e., Q=0, Q'=1, the inductor current flows through the low-side switch M2. The amplifier AMP detects the current flowing through the low-side switch M2 and generates the amplifying signal SAMP. As Q'=1, the pulse generating circuit PS outputs a high-level pulse signal to turn on the switch S2 for a time period. The amplifying signal SAMP is thus sampled and further held by the compensation capacitor CSLOPE. Afterwards, the pulse signal transits into a low-level logic state, the high-side switch M1 remains off and the low-side switch M2 remains on, the current sink U12 discharges the compensation capacitor CSLOPE with the second current I2. As the current I2 is proportional to the output voltage VOUT, the discharge current of the compensation capacitor CSLOPE is proportional to the output voltage VOUT.

When the high-side switch M1 is in an on state and the low-side switch M2 is in an off state, i.e., Q=1, Q'=0, the switch S1 is turned on, the current source U11 and the current sink U12 operates together to charge the compensation capacitor CSLOPE with a charging current equal to the difference between the first current I1 and the second current I2. As the first current I1 is proportional to the input voltage VIN, the charging current is thus proportional to the difference (VIN-VOUT) between the input voltage VIN and the output voltage VOUT.

In the synchronous buck converter, the rising slope of the inductor current is proportional to the difference (VIN-VOUT) between the input voltage VIN and the output voltage VOUT when the high-side switch M1 is on and the low-side switch M2 is off, and the falling slope of the inductor current is proportional to the output voltage VOUT when the high-side switch M1 is off and the low-side switch M2 is on. Thus, the ramp compensation signal VSLOPE is capable of emulating the inductor current. In the present invention, as the ramp compensation signal VSLOPE varies along with the inductor current, the ramp compensation circuit 206 is able to compensate the switching system and no oscillation event occurs even if a load of the switching converter varies. Moreover, the compensation is accomplished by emulating the inductor current rather than detecting the real-time inductor current, no high-speed amplifier is required and the circuit configuration is simplified.

To cancel the DC offset induced by the ramp compensation circuit 206, the DC calibration signal VOS is generated by sampling the ramp compensation signal VSLOPE through the switch S3 during a transition period when the high-side switch M1 transits from an off state into an on state, and by further filtering the sampled ramp compensation signal VSLOPE through the filtering circuit FIL. The sum of the DC calibration signal VOS and the reference signal VREF is configured to generate the calibrated reference signal VREF1 which is fed into the non-inverting input terminal of the comparator CMP. As the DC calibration circuit 207 uses sampling and holding technique instead of the conventional low-speed amplifier, the transient response performance of the switching system is thus improved.

Figure 3:
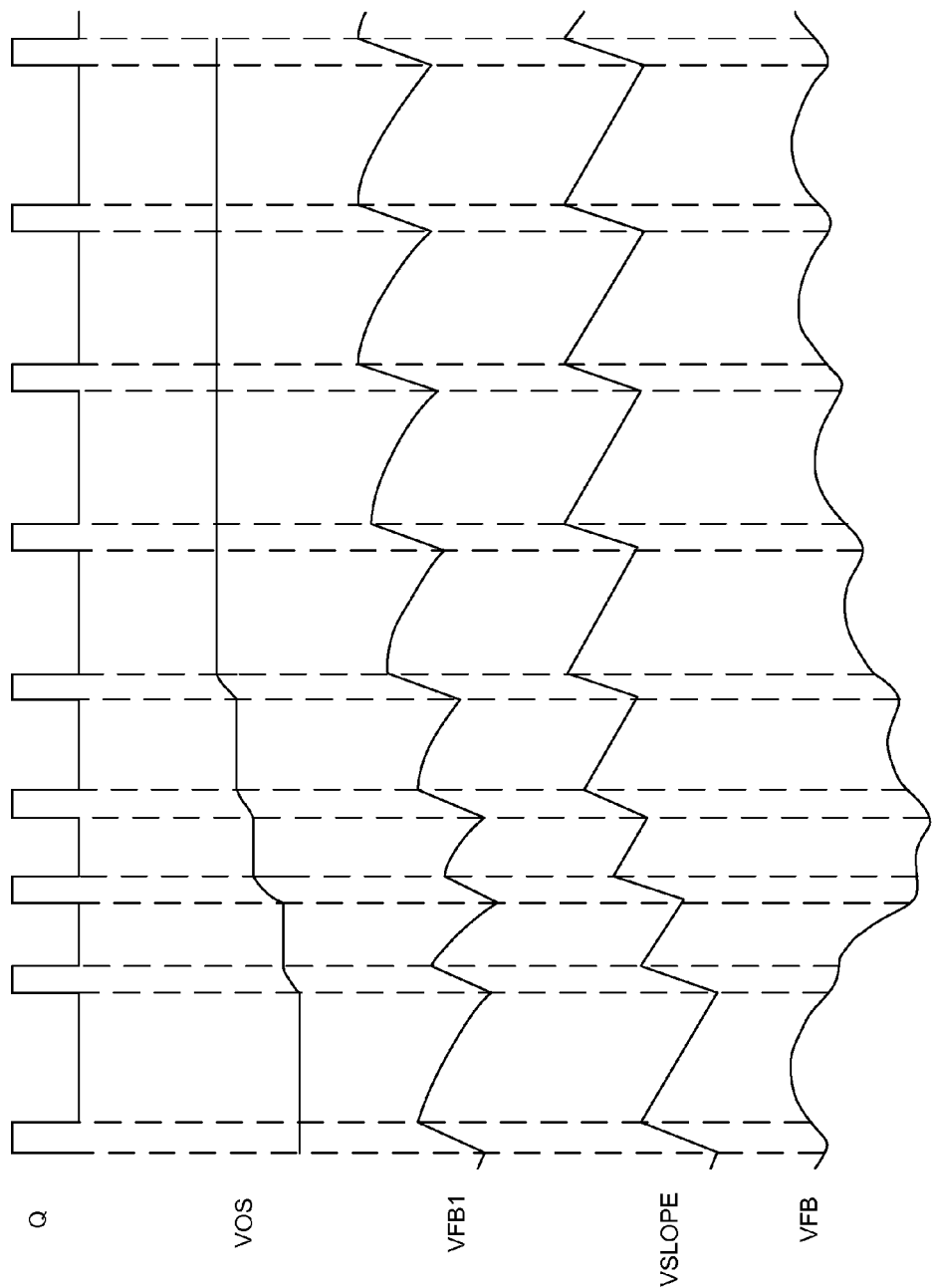
FIG. 3 illustrates a waveform diagram of the signals of the switching converter 200 when the load steps up.

FIG. 3 illustrates a waveform diagram of the signals of the switching converter 200 when the load steps up. The waveforms shown in FIG. 3, from the top down, respectively represent the control signal Q, the DC calibration signal VOS, the compensated feedback signal VFB1, the ramp compensation signal VSLOPE and the feedback signal VFB. As shown in FIG. 3, the output voltage VOUT as well as the feedback signal VFB decrease when the load of the switching converter 200 steps up, and the off time period of the high-side switch M1 decreases accordingly to regulate the output voltage VOUT. As the ramp compensation signal VSLOPE is capable of emulating the inductor current, the capacitor voltage ripple is compensated as a result. In addition, as the DC calibration voltage VOS is generated based on the ramp compensation signal VSLOPE, the DC calibration voltage VOS increases gradually, and the DC offset induced by the ramp compensation signal VSLOPE is eliminated.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

I claim:

1. A control circuit for controlling a switching circuit, wherein the switching circuit comprises a switch, and the switching circuit is configured to convert an input voltage into an output voltage, the control circuit comprises:
  an on-time generating circuit configured to generate an on-time signal;
  a ramp compensation circuit configured to generate a ramp compensation signal;
  a DC calibration circuit configured to generate a DC calibration signal by sampling the ramp compensation signal during a transition period when the switch transits from a first state into a second state and holding the sampled ramp compensation signal until a next transition period;
  a comparison circuit electrically coupled to the ramp compensation circuit and the DC calibration circuit, wherein the comparison circuit is configured to generate a comparison signal based on a feedback signal representative of the output voltage, a reference signal, the ramp compensation signal and the DC calibration signal; and
  a logic circuit electrically coupled to the on-time generating circuit and the comparison circuit, wherein the logic circuit is configured to generate a control signal to control the switching circuit based on the on-time signal and the comparison signal.

2. The control circuit of claim 1, wherein the DC calibration circuit comprises:
  a calibration switch having a first terminal, a second terminal and a control terminal, wherein the first terminal of the calibration switch is electrically coupled to the ramp compensation circuit to receive the ramp compensation signal, and the control terminal of the calibration switch is electrically coupled to the switching circuit to receive the control signal;
  a calibration capacitor having a first terminal and a second terminal, wherein the first terminal of the calibration capacitor is electrically coupled to the second terminal of the calibration switch, and the second terminal of the calibration capacitor is electrically coupled to a reference ground; and
  a filtering circuit having an input terminal and an output terminal, wherein the input terminal of the filtering circuit is electrically coupled to the second terminal of the calibration switch, and the output terminal of the filtering circuit is configured to provide the DC calibration signal.

3. The control circuit of claim 1, wherein the ramp compensation circuit is configured to generate the ramp compensation signal by charging a compensation capacitor with a current proportional to a difference between the input voltage and the output voltage and discharging the compensation capacitor with a current proportional to the output voltage, and by further sampling a current flowing through the switch so that the ramp compensation signal represents the current flowing through the switch for each switching cycle.

4. The control circuit of claim 1, wherein the ramp compensation circuit comprises:
  a current source having an input terminal and an output terminal, wherein the input terminal of the current source is electrically coupled to a power supply, and the output terminal of the current source is configured to provide a first current;
  a first switch having a first terminal, a second terminal and a control terminal, wherein the first terminal of the first switch is electrically coupled to the output terminal of the current source, and the control terminal of the first switch is electrically coupled to the logic circuit to receive the control signal;
  a current sink having an input terminal and an output terminal, wherein the input terminal of the current sink is electrically coupled to the second terminal of the first switch and is configured to provide a second current, and the output terminal of the current sink is electrically coupled to a reference ground;
  an amplifier electrically coupled to the switch of the switching circuit to detect a current flowing therethrough, wherein the amplifier is configured to generate an amplifying signal based on the current therethrough the switch of the switching circuit;
  a pulse generating circuit electrically coupled to the logic circuit, wherein the pulse generating circuit is configured to generate a pulse signal based on the control signal;
  a second switch having a first terminal, a second terminal and a control terminal, wherein the first terminal of the second switch is electrically coupled to the amplifier to receive the amplifying signal, the second terminal of the second switch is electrically coupled to the second terminal of the first switch, and the control terminal of the second switch is configured to receive the pulse signal; and
  a compensation capacitor having a first terminal and a second terminal, wherein the first terminal of the compensation capacitor is electrically coupled to the second terminal of the first switch and is configured to provide the ramp compensation signal, and the second terminal of the compensation capacitor is electrically coupled to the reference ground.

5. The control circuit of claim 4, wherein the first current is proportional to the input voltage, and the second current is proportional to the output voltage.

6. The control circuit of claim 4, wherein the switching circuit comprises a buck converting circuit, and the switch of the switching circuit comprises a low-side switch.

7. The control circuit of claim 1, wherein the switching circuit comprises a buck converting circuit, and the switch comprises a low-side switch, and wherein the ramp compensation signal is sampled by the DC calibration circuit during the transition period when the low-side switch transits from an on state into an off state.

8. A switching converter comprising:
  a switching circuit configured to convert an input voltage into an output voltage, wherein the switching circuit comprises a switch; and
  a control circuit comprising:
    an on-time generating circuit configured to generate an on-time signal;
    a ramp compensation circuit configured to generate a ramp compensation signal;
    a DC calibration circuit configured to generate a DC calibration signal by sampling the ramp compensation signal during a transition period when the switch transits from a first state into a second state and holding the sampled ramp compensation signal until a next transition period;
    a comparison circuit electrically coupled to the ramp compensation circuit and the DC calibration circuit, wherein the comparison circuit is configured to generate a comparison signal based on a feedback signal representative of the output voltage, a reference signal, the ramp compensation signal and the DC calibration signal; and a logic circuit electrically coupled to the on-time generating circuit and the comparison circuit, wherein the logic circuit is configured to generate a control signal to control the switching circuit based on the on-time signal and the comparison signal.

9. The switching converter of claim 8, wherein the DC calibration circuit comprises:

a calibration switch having a first terminal, a second terminal and a control terminal, wherein the first terminal of the calibration switch is electrically coupled to the ramp compensation circuit to receive the ramp compensation signal, and the control terminal of the calibration switch is electrically coupled to the switching circuit to receive the control signal;

a calibration capacitor having a first terminal and a second terminal, wherein the first terminal of the calibration capacitor is electrically coupled to the second terminal of the calibration switch, and the second terminal of the calibration capacitor is electrically coupled to a reference ground; and a filtering circuit having an input terminal and an output terminal, wherein the input terminal of the filtering circuit is electrically coupled to the second terminal of the calibration switch, and the output terminal of the filtering circuit is configured to provide the DC calibration signal.

10. The switching converter of claim 8, wherein the ramp compensation circuit is configured to generate the ramp compensation signal by charging a compensation capacitor with a current proportional to a difference between the input voltage and the output voltage and discharging the compensation capacitor with a current proportional to the output voltage, and by further sampling a current flowing through the switch so that the ramp compensation signal represents the current flowing through the switch for each switching cycle.

11. The switching converter of claim 8, wherein the ramp compensation circuit comprises:

a current source having an input terminal and an output terminal, wherein the input terminal of the current source is electrically coupled to a power supply, and the output terminal of the current source is configured to provide a first current;

a first switch having a first terminal, a second terminal and a control terminal, wherein the first terminal of the first switch is electrically coupled to the output terminal of the current source, and the control terminal of the first switch is electrically coupled to the logic circuit to receive the control signal;

a current sink having an input terminal and an output terminal, wherein the input terminal of the current sink is electrically coupled to the second terminal of the first switch and is configured to provide a second current, and the output terminal of the current sink is electrically coupled to a reference ground;

an amplifier electrically coupled to the switch of the switching circuit to detect a current flowing there through when the switch of the switching circuit is turned on, wherein the amplifier is configured to generate an amplifying signal based on the current there through the switch of the switching circuit;

a pulse generating circuit electrically coupled to the logic circuit, wherein the pulse generating circuit is configured to generate a pulse signal based on the control signal;

a second switch having a first terminal, a second terminal and a control terminal, wherein the first terminal of the second switch is electrically coupled to the amplifier to receive the amplifying signal, the second terminal of the second switch is electrically coupled to the second terminal of the first switch, and the control terminal of the second switch is configured to receive the pulse signal; and a compensation capacitor having a first terminal and a second terminal, wherein the first terminal of the compensation capacitor is electrically coupled to the second terminal of the first switch and is configured to provide the ramp compensation signal, and the second terminal of the compensation capacitor is electrically coupled to the reference ground.

12. The switching converter of claim 11, wherein the first current is proportional to the input voltage, and the second current is proportional to the output voltage.

13. The switching converter of claim 11, wherein the switching circuit comprises a buck converting circuit, and the switch of the switching circuit comprises a low-side switch.

14. The switching converter of claim 8, wherein the switching circuit comprises a buck converting circuit, and the switch comprises a low-side switch, and wherein the ramp compensation signal is sampled by the DC calibration circuit during the transition period when the low-side switch is turned off.

15. A control circuit for controlling a switching circuit, wherein the switching circuit comprises a high-side switch, a low-side switch and an inductor, and the switching circuit is configured to convert an input voltage into an output voltage, the control circuit comprises:

an on-time generating circuit configured to generate an on-time signal;

a ramp compensation circuit configured to generate a ramp compensation signal by charging a compensation capacitor with a current proportional toa difference between the input voltage and the output voltage and discharging the compensation capacitor with a current proportional to the output voltage, and by further sampling an inductor current flowing through the inductor so that the ramp compensation signal represents the inductor current for each switching cycle;

a DC calibration circuit configured to generate a DC calibration signal;

a comparison circuit electrically coupled to the switching circuit, the ramp compensation circuit and the DC calibration circuit, wherein the comparison circuit is configured to generate a comparison signal based on a feedback signal representative of the output voltage, a reference signal, the ramp compensation signal and the DC calibration signal; and a logic circuit electrically coupled to the on-time generating circuit and the comparison circuit, wherein the logic circuit is configured to generate a control signal to control the switching circuit based on the on-time signal and the comparison signal.

16. The control circuit of claim 15, wherein the ramp compensation circuit comprises:

a current source having an input terminal and an output terminal, wherein the input terminal of the current source is electrically coupled to a power supply, and the output terminal of the current source is configured to provide a first current;

a first switch having a first terminal, a second terminal and a control terminal, wherein the first terminal of the first switch is electrically coupled to the output terminal of the current source, and the control terminal of the first switch is electrically coupled to the logic circuit to receive the control signal;

a current sink having an input terminal and an output terminal, wherein the input terminal of the current sink is electrically coupled to the second terminal of the first switch and is configured to provide a second current, and the output terminal of the current sink is electrically coupled to a reference ground;

a pulse generating circuit electrically coupled to the logic circuit, wherein the pulse generating circuit is configured to generate a pulse signal based on the control signal;

a second switch having a first terminal, a second terminal and a control terminal, wherein the first terminal of the second switch is configured to receive a signal representative of an inductor current flowing through the inductor, the second terminal of the second switch is electrically coupled to the second terminal of the first switch, and the control terminal of the second switch is configured to receive the pulse signal; and a compensation capacitor having a first terminal and a second terminal, wherein the first terminal of the compensation capacitor is electrically coupled to the second terminal of the first switch and is configured to provide the ramp compensation signal, and the second terminal of the compensation capacitor is electrically coupled to the reference ground.

17. The control circuit of claim 16, wherein the ramp compensation circuit further comprises an amplifier electrically coupled to the low-side switch to detect a current flowing therethrough when the low-side switch is turned on, and wherein the amplifier is configured to generate an amplifying signal based on the current therethrough the low-side switch.

18. The control circuit of claim 16, wherein the first current is proportional to the input voltage, and the second current is proportional to the output voltage.

19. The control circuit of claim 15, wherein the DC calibration circuit comprises:

a calibration switch having a first terminal, a second terminal and a control terminal, wherein the first terminal of the calibration switch is electrically coupled to the ramp compensation circuit to receive the ramp compensation signal, and the control terminal of the calibration switch is electrically coupled to the switching circuit to receive the control signal;

a calibration capacitor having a first terminal and a second terminal, wherein the first terminal of the calibration capacitor is electrically coupled to the second terminal of the calibration switch, and the second terminal of the calibration capacitor is electrically coupled to a reference ground; and a filtering circuit having an input terminal and an output terminal, wherein the input terminal of the filtering circuit is electrically coupled to the second terminal of the calibration switch, and the output terminal of the filtering circuit is configured to provide the DC calibration signal.

* * * * *